(12) United States Patent
Adams et al.

(10) Patent No.: US 12,231,396 B2
(45) Date of Patent: Feb. 18, 2025

(54) NETWORK CONFIGURATION USING PREFERRED AND FALLBACK POSTURES FOR CUSTOMER PREMISES EQUIPMENT

(71) Applicant: Charter Communications Operating, LLC, St. Louis, MO (US)

(72) Inventors: Anthony Adams, Parker, CO (US); Erez Jordan Gottlieb, Denver, CO (US); Tyson Reid Vinson, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 30 days.

(21) Appl. No.: 17/852,461

(22) Filed: Jun. 29, 2022

(65) Prior Publication Data
US 2024/0007434 A1 Jan. 4, 2024

(51) Int. Cl.
*H04L 61/5053* (2022.01)
*H04L 41/0816* (2022.01)
*H04L 61/251* (2022.01)
*H04L 61/5014* (2022.01)

(52) U.S. Cl.
CPC ...... *H04L 61/5053* (2022.05); *H04L 41/0816* (2013.01); *H04L 61/251* (2013.01); *H04L 61/5014* (2022.05)

(58) Field of Classification Search
None
See application file for complete search history.

(56) References Cited

U.S. PATENT DOCUMENTS

| | | | |
|---|---|---|---|
| 2006/0031921 A1* | 2/2006 | Danforth | H04L 63/10 726/1 |
| 2008/0281973 A1* | 11/2008 | Yang | H04L 61/59 709/227 |
| 2016/0014071 A1* | 1/2016 | Asati | H04L 61/251 709/245 |
| 2019/0132283 A1* | 5/2019 | Ballard | H04L 61/4541 |
| 2019/0297102 A1* | 9/2019 | Davis, III | H04L 63/1416 |
| 2022/0200951 A1* | 6/2022 | Goel | H04L 61/10 |
| 2022/0385623 A1* | 12/2022 | Henry | H04L 61/5038 |

* cited by examiner

*Primary Examiner* — Mohamed Ibrahim
(74) *Attorney, Agent, or Firm* — Young Basile Hanlon & MacFarlane, P.C.

(57) ABSTRACT

Methods and systems for providing multiple techniques to a customer premises equipment to acquire network connectivity. A method for acquiring an Internet Protocol (IP) lease includes sending, by a network device at a customer premises to a service provider system, a request for a preferred acquisition posture, where the network device is provisioned with multiple acquisition postures including the preferred acquisition posture, receiving, by the network device from the service provider system, a selected acquisition posture, attempting, by the network device, to acquire the IP lease using the selected acquisition posture, and operating, by the network device, using the acquired IP lease.

20 Claims, 12 Drawing Sheets

NETWORK CONFIGURATION USING PREFERRED AND FALLBACK POSTURES FOR CUSTOMER PREMISES EQUIPMENT

TECHNICAL FIELD

This disclosure relates to network services. More specifically, this disclosure relates to providing multiple techniques to a customer premises equipment to acquire network connectivity.

BACKGROUND

Multiple-system operators (MSOs), cable companies, and the like (collectively "service providers") carry data traffic over their networks via fiber and coaxial cable. For example, MSG's Hybrid Fiber Coax (HFC) access networks carry the majority of the MSG's Internet cable data traffic. Networking and internetworking communication protocols are relied upon to carry data through the networks.

The Internet Protocol (IP) is the principal communications protocol in the Internet protocol suite for relaying and routing packets across the networks from a source to a destination. It describes the format of packets, the addressing scheme, and other specifications for network and computing devices to communicate over the network. Internet Protocol Version 4 (IPv4) is the fourth revision of the IP. IPv4 uses a 32-bit address scheme allowing for a total of 2^32 IP addresses, where each IP address is a numerical label assigned to a device connected to the network. The IP address is a unique identifier for a device and each device needs its own IP address. As evident, there is a limited number of IPv4 IP addresses. The rapid development of the Internet has reached a point where most IPv4 addresses have already been distributed. IPv6 is the sixth revision of the IP and uses a 128-bit address, theoretically allowing 2^128 IP addresses.

Service providers need to grow their networks using IPv6 and maintain support of IPv4 customers until transition to IPv6 is completed.

SUMMARY

Disclosed herein are methods and systems for providing multiple techniques to a customer premises equipment to acquire network connectivity.

In implementations, a method for acquiring an Internet Protocol (IP) lease includes sending, by a network device at a customer premises to a service provider system, a request for a preferred acquisition posture, where the network device is provisioned with multiple acquisition postures including the preferred acquisition posture, receiving, by the network device from the service provider system, a selected acquisition posture, attempting, by the network device, to acquire the IP lease using the selected acquisition posture, and operating, by the network device, using the acquired IP lease.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Figure 1:
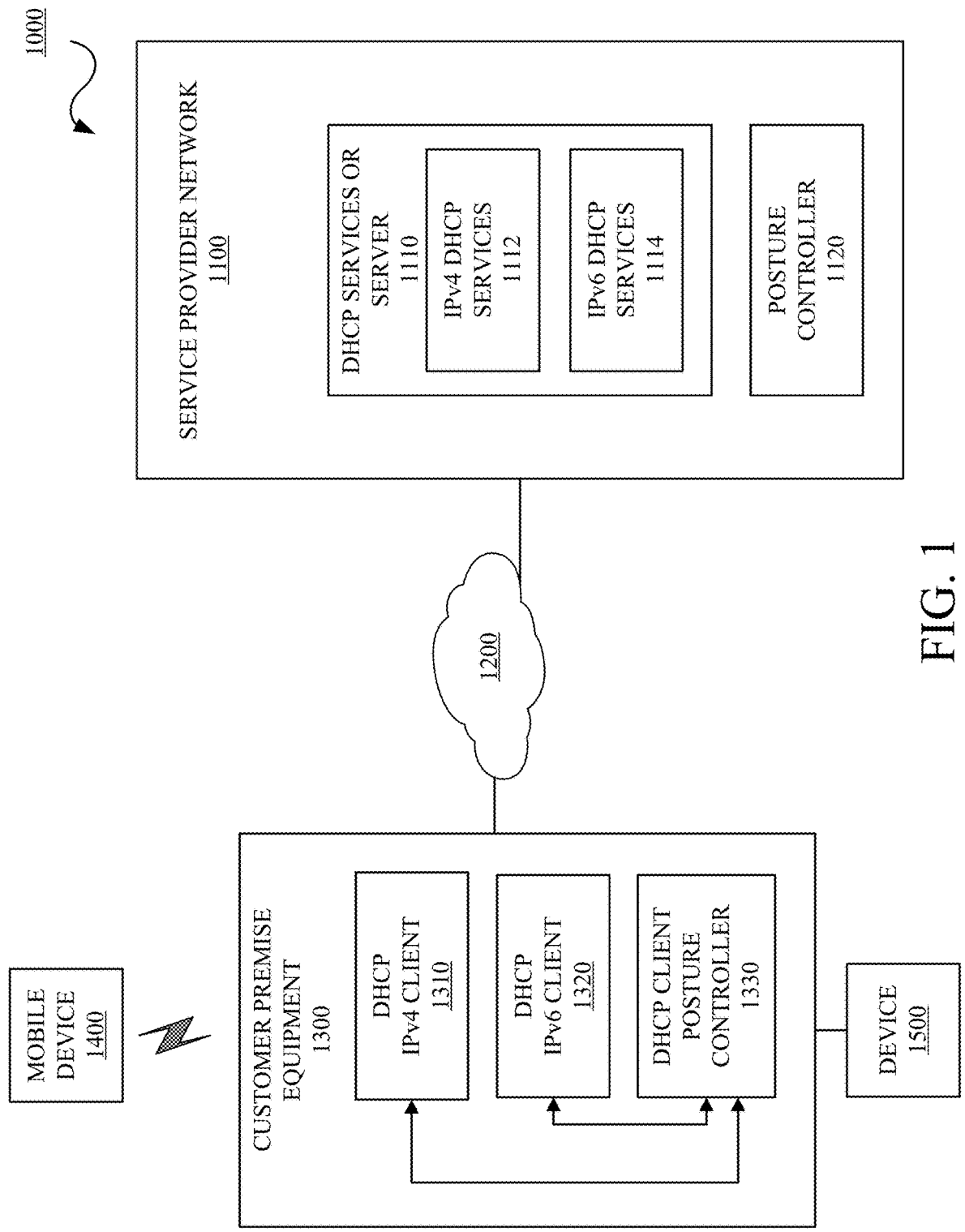
FIG. 1 is a diagram of an example network in accordance with embodiments of this disclosure.

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer", "computing device", or "computing platform" includes any unit, or combination of units, in a distributive platform, centralized platform, or combinations thereof, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, manufactures, and/or compositions of matter, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Networking and internetworking communication protocols are relied upon to carry data through the networks. The Internet Protocol (IP) is the principal communications protocol in the Internet protocol suite for relaying and routing packets across the networks from a source to a destination, which currently includes IPv4 and IPv6. Multiple techniques can be used to provide both IPv4 and IPv6 connectivity services to a customer premises.

Dual stack techniques provide dual stack devices with network interfaces or protocol stacks that can originate, receive, or understand both IPv4 and IPv6 packets. Dual stack devices can interact with IPv4 devices, IPv6 devices, and other dual stack devices.

IPv6 transition technology facilitates the transitioning of the Internet from the IPv4 infrastructure to the IPv6 networks since IPv4 and IPv6 are not directly interoperable. Mapping of Address and Port using translation (MAP-T) is an IPv6 transition technology that allows IPv4 addresses to be translated into IPv6 without the need for stateful translation on the service provider network. This enables service providers the ability to leverage IPv6 only networks to co-exist with IPv4-only devices on the subscriber's network in a manner that has minimal impact on the user experience. The MAP-T mode uses the stateless IP/ICMP translation algorithm (SIIT) to convert IPv4 headers into IPv6 headers and follows stateless translation rules defined in RFC 6145. MAP-T assigns a port range to customer premises equipment (CPEs) that share the same public IPv4 address. This allows the address and port range combination that is translated in the IPv6 header to be represented uniquely. In this way, IPv6 aggregation logic can be used to direct packets in a stateless fashion, rather than relying upon per-subscriber or per-connection criteria to determine state.

Described herein are methods and systems for orchestrating negotiation of a preferred acquisition posture by a CPE including provision of a fallback acquisition posture. This can be achieved through the specification and implementation of posture controller, firmware, software, logic, and/or combinations thereof (collectively "posture controller") at a service provider's customer facing Dynamic Host Configuration Protocol (DHCP) servers or services and at the CPE, which collectively oversee and orchestrate the behavior of DHCP clients deployed, provisioned, imaged, and/or combinations thereof (collectively "deployed") on a device, such as the CPE. In some implementations, the DHCP clients can include a IPv4 DHCP client, a IPv6 DHCP client, and/or other like DHCP clients. A preferred acquisition posture and a fallback acquisition posture can be deployed on the device with respect to the deployed DHCP clients, where a posture refers to methods or techniques used to acquire an Internet Protocol (IP) address or lease (collectively "lease"), resulting in a network configuration for the device. For example, successful execution of a preferred posture can result in acquiring a preferred IP lease. In some implementations, the posture controller can control a posture to be executed by the device.

In some implementations, the posture controller can control and configure network configuration of or network connectivity for the device by instructing the device to attempt to execute the preferred acquisition posture and acquire the preferred IP lease. If the preferred acquisition posture fails to acquire the IP lease or is unsuccessful, the posture controller can instruct the device to attempt to execute the fallback acquisition posture to acquire an IP lease. In some implementations, the preferred acquisition posture can be a MAP-T acquisition posture. In some implementations, the preferred acquisition posture can be a dual stack acquisition posture. In some implementations, the preferred acquisition posture can be dependent on network deployment at a location, user defined device configuration or user considerations, administrative network configuration or system or operator considerations, and/or combinations thereof.

In some implementations, in the absence of a connection to the service provider deploying the device and receiving instructions from the service provider, the device can attempt to execute and acquire an IP lease using the preferred acquisition posture and, if needed, can attempt to execute and acquire using the fallback acquisition posture.

In some implementations, a device can be in a degraded network configuration where acquisition of all the IP leases per the acquisition posture has not been successful. In these instances, if the device is in a degraded network configuration, the device can attempt to acquire the non-acquired IP lease.

In some implementations, the service provider can update the device with a preferred network configuration, a fallback network configuration, and/or combinations thereof based on machine learning techniques, network deployment at a location, user defined device configurations, administrative network configurations, and/or combinations thereof based on usage.

In some implementations, posture acquisition methods, techniques, flows, or sequences (collectively "posture acquisition methods") to obtain the IP lease(s) are service provider directed. In some implementations, the posture acquisition methods are device directed based on stored posture and/or configuration information. In some implementations, the posture acquisition methods to obtain the preferred network configuration or the fallback network configuration are directed cooperatively by the service provider and device. In some implementations, the posture acquisition methods are automatic once initiated.

The described methods and systems can facilitate transition to more efficient IPv4 operations. Moreover, implementation of the described methods and systems are transparent or invisible to the customer or user.

FIG. 1 is a diagram of an example network 1000 in accordance with some embodiments of this disclosure. The network 1000 can include a service provider system or network 1100, a network 1200, customer premises equipment (CPE) 1300, a mobile device 1400, and a device 1500. The service provider network 1100, the network 1200, the CPE 1300, the mobile device 1400, and the device 1500 can be connected to or be in communication with (collectively "connected to") each other and use, as appropriate and applicable, wired and wireless techniques, systems, and devices, including but not limited to, hybrid coaxial fiber, coaxial fiber, the Internet, an intranet, wide area networks (WANs), a low power WAN (LPWAN), local area networks (LANs), a public network, a private network, a cellular network, a WiFi-based network, a telephone network, a landline network, a public switched telephone network (PSTN), a wireless network, a wired network, a private branch exchange (PBX), an Integrated Services Digital Network (ISDN), an IP Multimedia Services (IMS) network, a Voice over Internet Protocol (VoIP) network, data over cable service interface specification (DOCSIS) access technology, Digital Subscriber Line (DSL) access technology, Passive Optical Network (PON) access technology, and the like including any combinations thereof. The network 1000 and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The service provider network 1100 can provide services including, but not limited to, internet services, voice services, wireless services, broadband services, high speed data services, cable, Internet, Voice over Internet Protocol service, and wired services (collectively "services), to consumers and subscribers ("subscribers") via CPE 1300. The services can be provided to subscriber devices, such as the mobile device 1400 and the device 1500, using at least IPv4 based networks, IPv6 based networks, other networks, and/or combinations thereof. The service provider network 1100 can include Dynamic Host Configuration Protocol (DHCP) services 1110 to dynamically assign an IP address and other network configuration parameters to each device on a network so the device can communicate with other network elements or devices. The DHCP services 1110 can be implemented using one or more servers using a variety of computing architectures. The service provider network 1100 and the components therein may include other elements which may be desirable or necessary to implement the devices, systems, compositions, and methods described herein. However, because such elements and steps are well known in the art, and because they do not facilitate a better understanding of the disclosed embodiments, a discussion of such elements and steps may not be provided herein.

The DHCP services 1110 use DHCP to provide initial and updated network configurations and services to requesting devices such as the CPE 1300, cable modem termination systems (CMTS), and/or other network devices, for example. The DHCP is a network management protocol used by the DHCP services or server 1110 to dynamically assign an IP address and other network configuration parameters to each device on a network so the device can communicate with other network elements or devices. In some implementations, the DHCP services 1110 can include IPv4 DHCP services 1112, IPv6 DHCP services 1114, and/or combinations thereof. The IPv4 DHCP services 1112 and the IPv6 DHCP services 1114 operate separately, each having an independent state machine. The DHCP services 1110 function on a client-server basis with DHCP clients on requesting devices as described herein.

The CPE 1300 can be, but is not limited to, routers, network switches, gateways, set-top boxes, fixed mobile convergence products, home networking adapters, and Internet access gateways that enable subscribers or customers to access a service provider's services and distribute them in a residence, enterprise, office, or like infrastructure. In implementations, the CPE 1300 can be equipment located at a customer's premises and connected with a service providers network 1100 and/or telecommunications equipment. In some implementations, the CPE 1300 can be deployed with a DHCP IPv4 client 1310, a DHCP IPv6 client 1320, and/or combinations thereof with are in a client-server relationship with the IPv4 DHCP services 1112 and the IPv6 DHCP services 1114, respectively.

The service provider network 1100 can include a posture controller 1120 and the CPE 1300 can include a DHCP client posture controller 1330 to collectively facilitate efficient and subscriber transparent connectivity to deployed IP networks as described herein. In some implementations, the posture controller 1120 and the DHCP client posture controller 1330 can collectively execute the methods and techniques described herein with respect to FIGS. 2-9 and 11-12, either solely or in combination, as appropriate. In some implementations, the DHCP client posture controller 1330 can include information with respect to a locally preferred posture. This information can be stored on the CPE 1300 during deployment of the CPE and/or updated based on operational and/or historical usage.

Although the posture controller 1120 and the DHCP services 1110 are shown as separate, the posture controller 1120 and the DHCP services 1110 can be an integrated services or an integrated controller, as appropriate.

The network 1200 can be, but is not limited to, hybrid coaxial fiber, coaxial fiber, the Internet, an intranet, a low power WAN (LPWAN), LANs, WANs, a public network, a private network, a cellular network, a WiFi-based network, a telephone network, a landline network, a public switched telephone network (PSTN), a wireless network, a wired network, a private branch exchange (PBX), an Integrated Services Digital Network (ISDN), a IP Multimedia Services (IMS) network, a Voice over Internet Protocol (VoIP) network, and the like including any combinations thereof. In implementations, the network 1300 can include, but is not limited to, IPv4 based networks, IPv6 based networks, and/or combinations thereof.

The mobile device 1400 can be, but is not limited to, end user devices, cellular phones, Internet Protocol (IP) devices, mobile computers, laptops, handheld computers, personal media devices, smartphones, notebooks, notepads, and the like. In some implementations, the mobile device 1400 can be wirelessly connected to the CPE 1300. The mobile device 1400 can be, but is not limited to, a IPv4 device, a IPv6 device, and/or combinations thereof. The device 1500 can be, but is not limited to, mobile devices, smart appliances, desktops, smart devices, and the like. The device 1500 can be, but is not limited to, a IPv4 device, a IPv6 device, and/or combinations thereof. In some implementations, the device 1500 can be connected to the CPE 1300 via a cable, a connector, or the like. The number of devices, such as the mobile device 1400 and the device 1500, connected to the CPE 1300 is illustrative. There can be multiple such devices.

Figure 2:
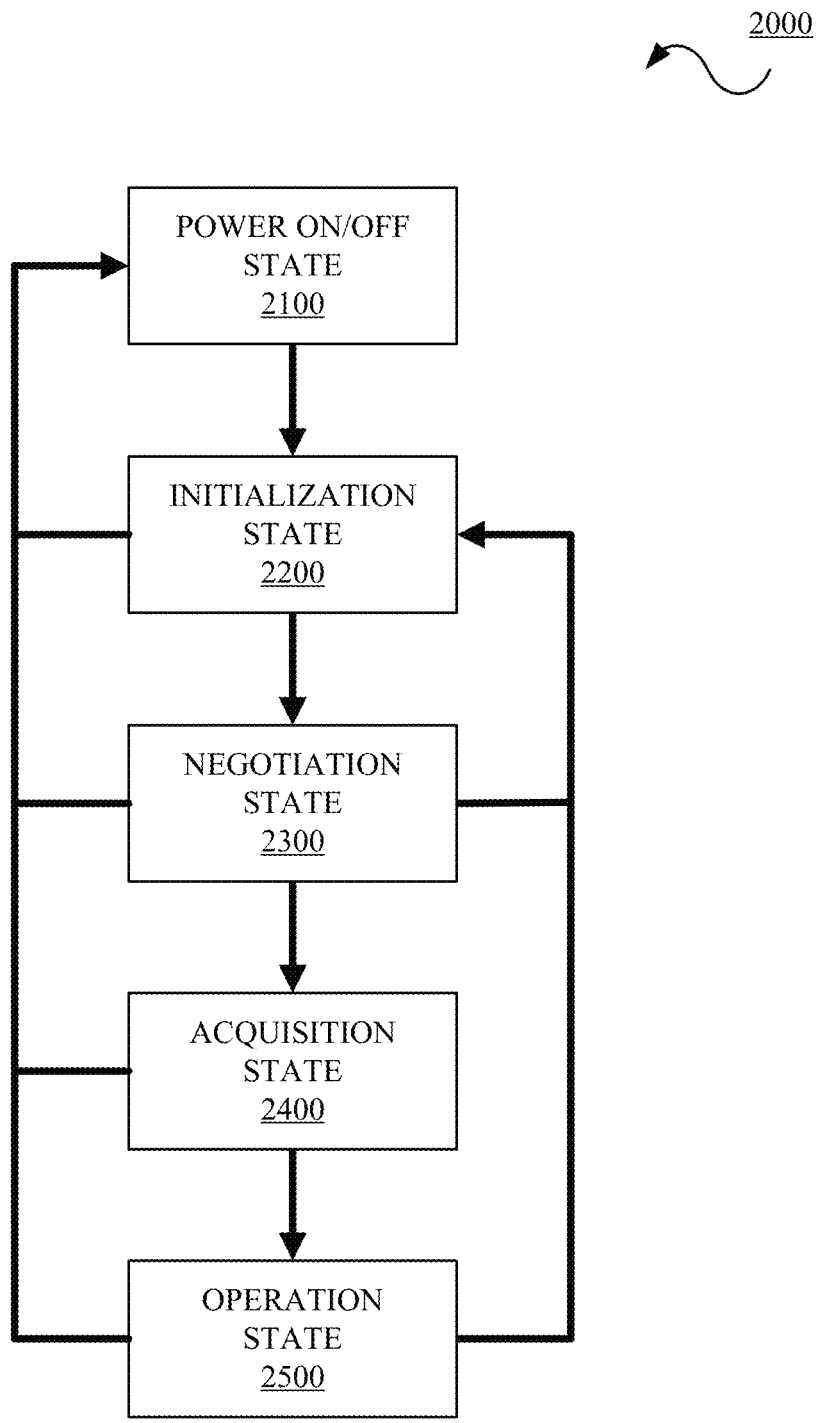
FIG. 2 is a diagram of an example state machine for posture determination and network configuration acquisition in accordance with embodiments of this disclosure.

FIG. 2 is a diagram of an example state machine 2000 for posture determination and network configuration acquisition in accordance with embodiments of this disclosure. The state machine 2000 can be collectively executed or performed by the posture controller 1120 and the DHCP client posture controller 1330, for example. In some implementations, the state machine 2000 can include, but is not limited to, a power on/off state 2100, an initialization state 2200, a negotiation state 2300, an acquisition state 2400, and an operation state 2500. Powering on of a device, such as the CPE 1300, moves the state machine 2000 from the power on/off state 2100 to the initialization state 2200. Powering off of the device moves the state machine 2000 from any one of the initialization state 2200, the negotiation state 2300, the acquisition state 2400, and the operation state 2500 to the power on/off state 2100.

Figure 3:
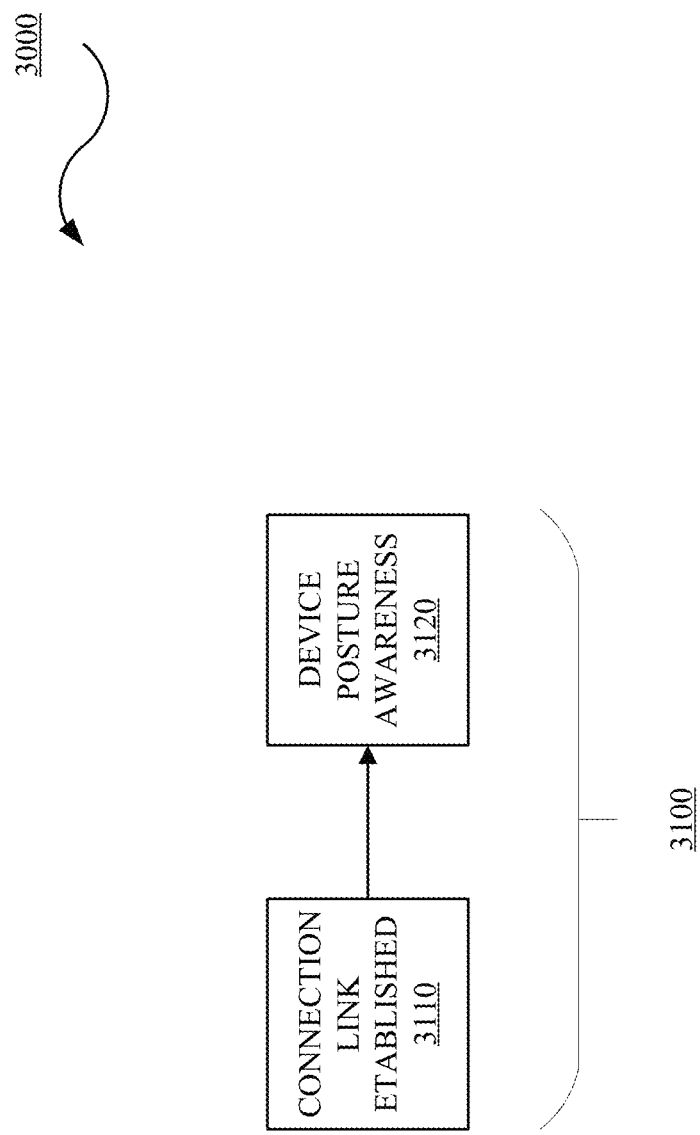
FIG. 3 is a diagram of an example flow for posture awareness of FIG. 2 in accordance with embodiments of this disclosure.

In the initialization state 2200, the device can perform a confirmation process 3000 as shown in FIG. 3. The confirmation process 3000 includes the device establishing a communications link 3110 between the device and the service provider. The device can then determine or become aware of device capabilities, a preferred acquisition posture, posture considerations or information, deployed DHCP clients, environmental data, traffic data, premises information, network configuration, firmware default, customer constraints, and/or other information (collectively "device information") from accessing device memory. The preferred acquisition posture can be referred to as a locally preferred acquisition posture. In some implementations, the acquisition postures can include, but are not limited to, a MAP-T acquisition posture and a dual stack acquisition posture. Other acquisition postures can be used to acquire IP connectivity. The device can proceed to the negotiation state 2300 after successfully undergoing or performing the confirmation process 3000.

Referring back to FIG. 2, in the negotiation state 2300, the device can send and assert the locally preferred acquisition posture and send device information to the posture controller. The posture controller can approve the locally preferred acquisition posture or indicate alternate acquisition posture based on the device capabilities and operator or service provider constraints. In some implementation, the device can update stored information, such as the locally preferred acquisition posture, based on the negotiated or selected acquisition posture. The device can proceed to the acquisition state 2400 after negotiating the acquisition posture. In some implementations, the device can return to the initialization state 2200 from the negotiation state 2300. For example, a link state of the device could change during the negotiation state 2300. Illustratively, the device's WAN interface or connection goes to a DOWN state and then returns to an UP state. In this instance, there is a reinitialization of the link (e.g., Open Systems Interconnection (OSI) layers 1 and 2) which necessitates a renegotiation of the IP addressing posture (e.g., OSI layer 3).

In the acquisition state 2400, the device can initiate DHCP client routines or execute network configuration or IP lease acquisition routines in accordance with the negotiated or selected (collectively "selected") acquisition posture. In some implementation, the device can update stored information, such as the acquired network configuration, based on execution of the network configuration acquisition routines for the selected acquisition posture. The device can proceed to the operational state 2500 after acquiring the IP lease(s) or network configuration based on the selected acquisition posture.

In the operational state 2500, the device can execute operations in conjunction with the acquired IP lease(s) or network configuration. In some implementation, the device can update stored information, such as operational information for the acquired network configuration. In some implementation, the device can update stored information, such as customer and/or operator constraints on stored postures, stored network configurations, and/or stored operational information for the acquired IP lease(s) or network configuration. In some implementations, the device can return to the initialization state 2200 from the operational state 2500 for the reasons stated for returning to the initialization state 2200 from the negotiation state 2300. In some implementations, a remote reboot can be initiated using administrative or management controls available in the operational state 2500 that would force a given device enter the initialization state 2200.

Figure 4:
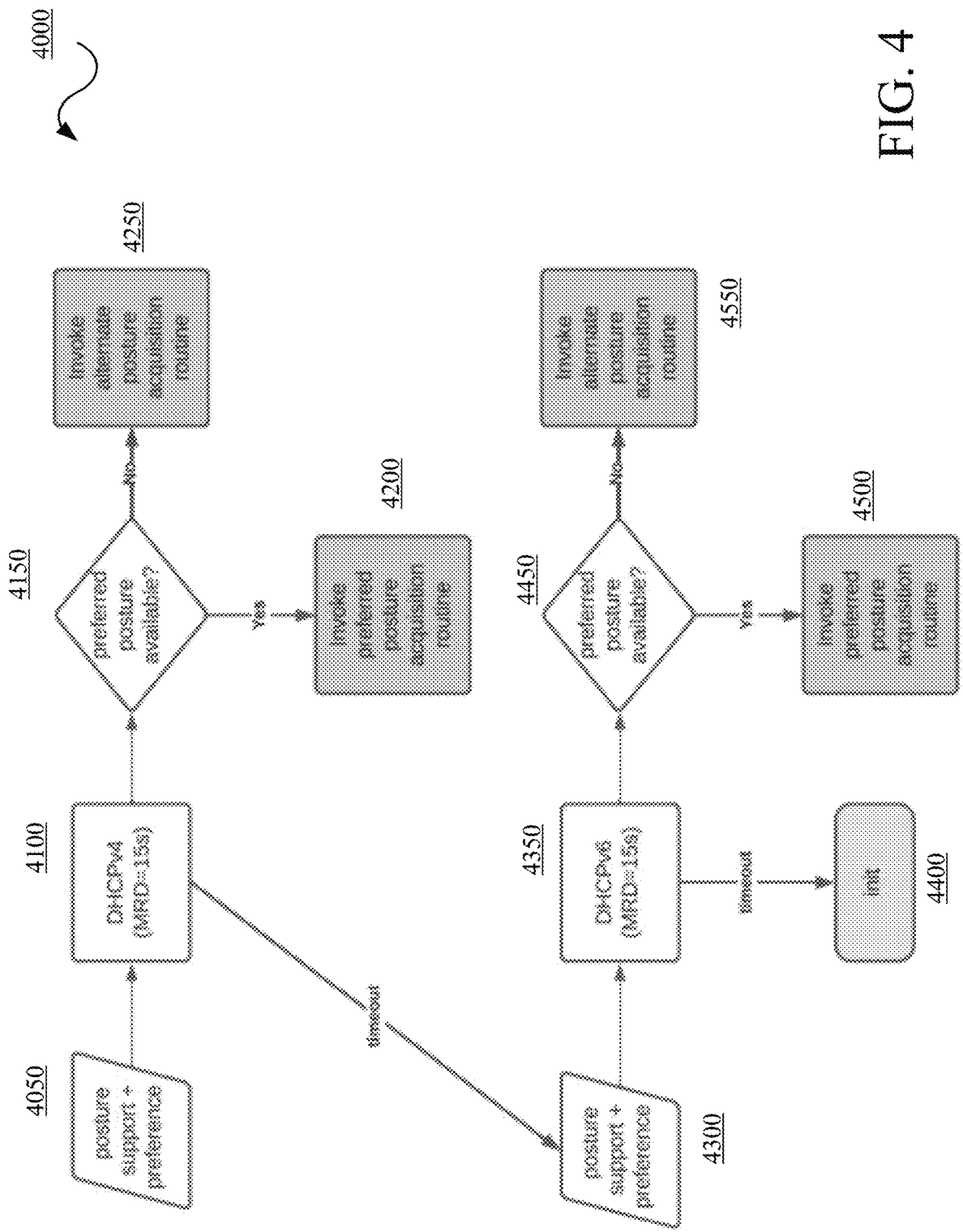
FIG. 4 is a diagram of an example flow for posture determination and network configuration acquisition in accordance with embodiments of this disclosure.

FIG. 4 is a diagram of an example flow 4000 for acquisition posture determination and network configuration acquisition in accordance with embodiments of this disclosure. Appropriate portions of the flow 4000 can occur at different points in a state machine for posture determination and IP lease or network configuration acquisition, as shown for example in FIG. 2. The flow 4000 can be performed by a device such the CPE 1300, a network device, a router, a gateway, and like devices. The device can include a posture controller and multiple DHCP clients such as, for example, a DHCP IPv4 client and a DHCP IPv6 client. The posture controller can control or direct execution by the DHCP clients. In some implementations, the posture controller is in communication with a service provider posture controller, which controls the sequencing executed by the posture controller at the device. In some implementations, the posture controller may not be in communication with the service provider posture controller, and can direct sequencing based on stored a preferred acquisition posture or posture acquisition information.

At 4050, the posture controller can determine device information including a preferred acquisition posture and initiate a DHCP IPv4 client acquisition loop. In some implementations, the posture controller can start with a DHCP IPv6 client acquisition loop. In some implementations, which DHCP client acquisition loop to use can depend on a variety of factors including, the device information, operator or system provider constraints, service location, and/or other factors. FIG. 4. is illustrative of starting with the DHCP IPv4 client acquisition loop. At 4100, the posture controller can start a DHCP IPv4 timer or counter for the DHCP IPv4 client acquisition loop to provide a mechanism for exiting the DHCP IPv4 client acquisition loop when the DHCP IPv4 client acquisition loop is unsuccessful. At 4150, the posture controller can receive, from a service provider posture controller, confirmation to use a preferred acquisition posture at 4200 or receive instructions to use a fallback or alternate acquisition posture at 4250. The number of acquisition postures is illustrative and additional acquisition postures can be used.

If the DHCP IPv4 timer times out or expires or the counter reaches or exceeds a maximum value, the posture controller can initiate, at 4300, a DHCP IPv6 client acquisition loop. At 4350, the posture controller can start a DHCP IPv6 timer or counter for the DHCP IPv6 client acquisition loop. At 4450, the posture controller can initiate a preferred acquisition posture at 4500 or initiate a fallback or alternate acquisition posture at 4550. If the DHCP IPv6 timer times out or counter reaches or exceeds a maximum value, the posture controller can re-start the process. For example, the posture controller can return to the initialization state 2200 in FIG. 2.

Figure 5:
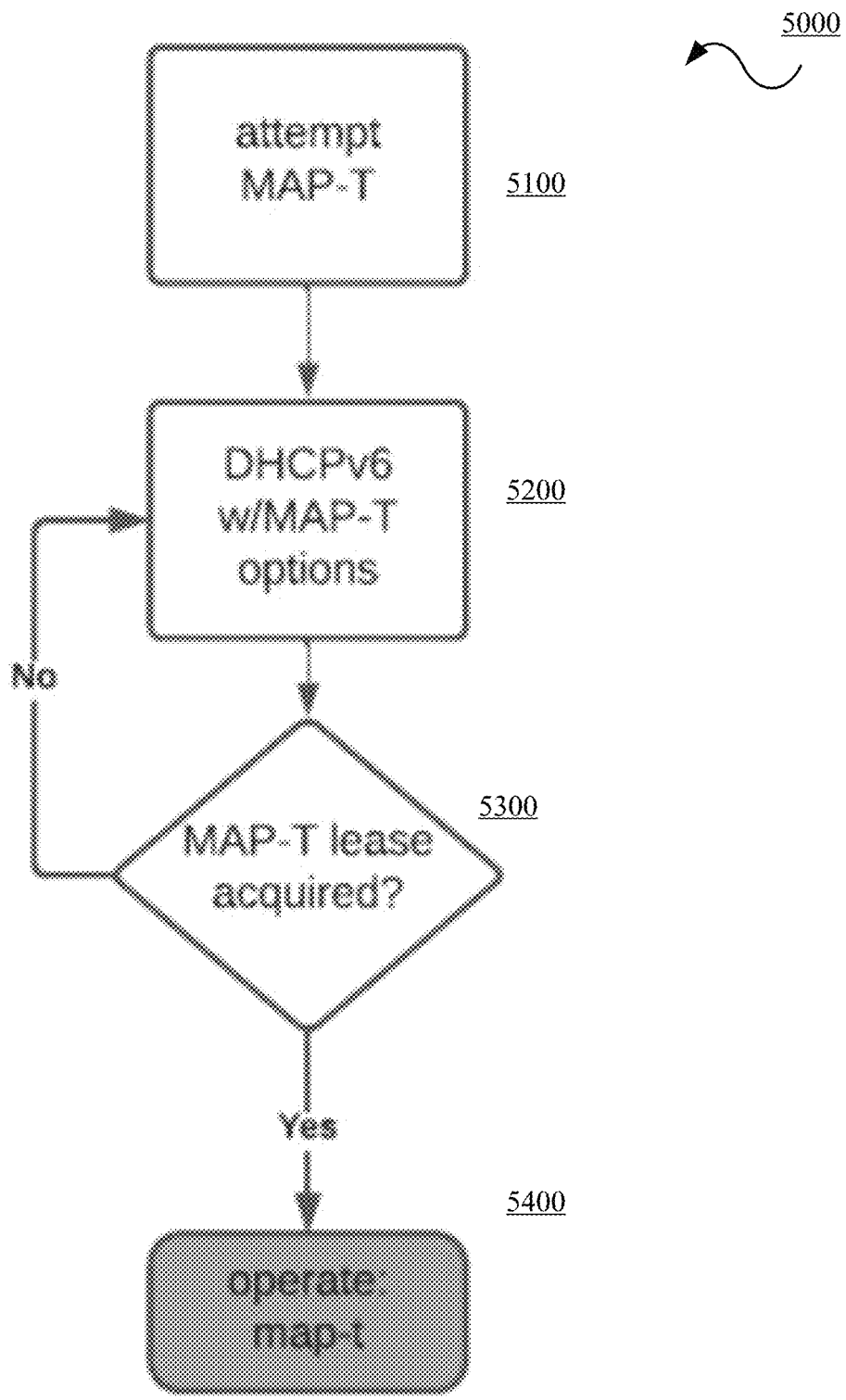
FIG. 5 is a diagram of an example flow for MAP-T posture acquisition in accordance with embodiments of this disclosure.
Figure 6:
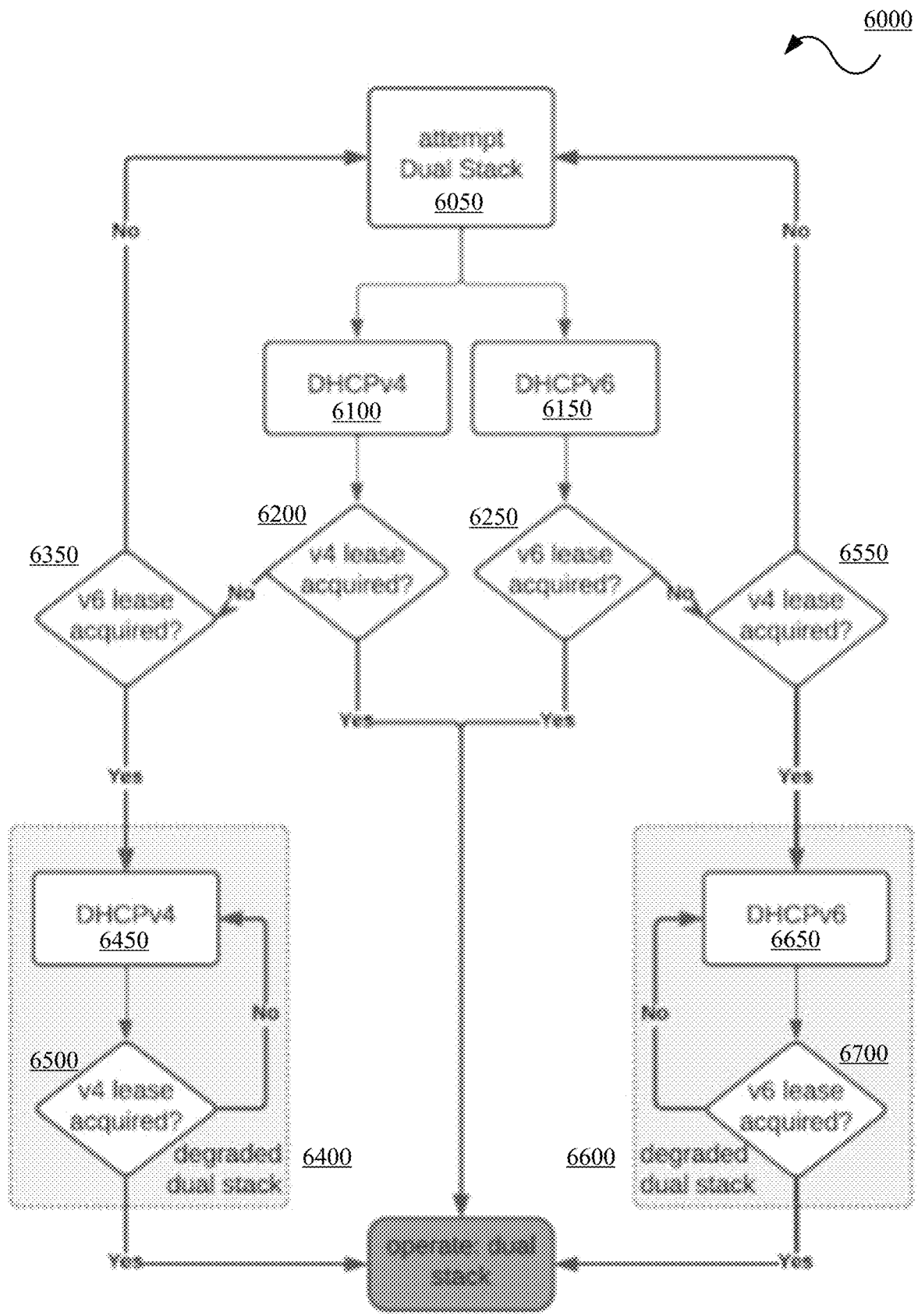
FIG. 6 is a diagram of an example flow for dual stack posture acquisition in accordance with embodiments of this disclosure.

The preferred acquisition posture at 4200, the fallback or alternate acquisition posture at 4250, the preferred acquisition posture at 4500, and/or the fallback or alternate acquisition posture at 4550 can be a MAP-T acquisition posture 5000 as shown in FIG. 5, a dual stack acquisition posture 6000 as shown in FIG. 6, a DHCP IPv4 acquisition posture, a DHCP IPv6 acquisition posture, or other acquisition posture methods, as appropriate and applicable. If MAP-T is the configuration to be acquired, then only DHCPv6 lease is attempted. If dual stack is the configuration to be acquired, then both DHCPv4 and DHCPv6 leases are attempted, although only one lease is needed for operation as described herein. Appropriate ones of the service provider posture controller, the DHCPv4 services, the DHCPv6 services, and/or combinations thereof will provide or signal which of the DHCPv6 lease, DHCPv4 lease, and/or both are to be attempted.

Referring now to FIG. 5, the MAP-T acquisition posture 5000 includes initiating, at 5100, an attempt at acquiring a MAP-T network configuration. At 5200, a DHCP IPv6 client provisioned with MAP-T options can start an IPv6 lease or address acquisition process. At 5300, a determination is made as to whether a MAP-T lease has been obtained. The IPv6 address acquisition process is repeated for unsuccessful acquisition of a MAP-T lease. At 5400, the device can operate in a MAP-T network configuration upon successful acquisition of a MAP-T lease. As noted, the MAP-T acquisition posture 5000 is subject to the timer or counter as described herein.

Referring now to FIG. 6, the dual stack acquisition posture 6000 includes initiating, at 6050, an attempt at acquiring a dual stack network configuration. At 6100 and 6150, a DHCP IPv4 client and a DHCP IPv6 client, starts an IPv4 address acquisition process and an IPv6 address acquisition process. At 6200 and 6250, a determination is made as to whether a IPv4 lease and an IPv6 lease has been obtained, respectively. At 6300, the device can operate in a dual stack network configuration upon successful acquisition of both IPv4 and IPv6 leases.

At 6350, a determination is made whether an IPv6 lease has been obtained. If an IPv6 lease has not been obtained, the process cycles back to re-attempting the dual stack posture acquisition at 6050. If an IPv6 lease has been obtained and the device is in a degraded dual stack posture, at 6450, an attempt is made to obtain an IPv4 address. At 6500, a determination is made as to whether a IPv4 lease has been obtained. If an IPv4 lease has not been obtained, the process cycles back to re-attempting to obtain the IPv4 lease at 6450. If the IPv4 lease has been obtained, the device can operate in a dual stack network configuration at 6300.

At 6550, a determination is made whether an IPv4 lease has been obtained. If an IPv4 lease has not been obtained, the process cycles back to re-attempting the dual stack posture acquisition at 6050. If an IPv4 lease has been obtained and the device is in a degraded dual stack posture, at 6650, an attempt is made to obtain an IPv6 address. At 6700, a determination is made as to whether a IPv6 lease has been obtained. If an IPv6 lease has not been obtained, the process cycles back to re-attempting to obtain the IPv6 lease at 6650. If the IPv6 lease has been obtained, the device can operate in a dual stack network configuration at 6300.

As noted, the dual stack acquisition posture 6000 is subject to the timer or counter as described herein.

Figure 7:
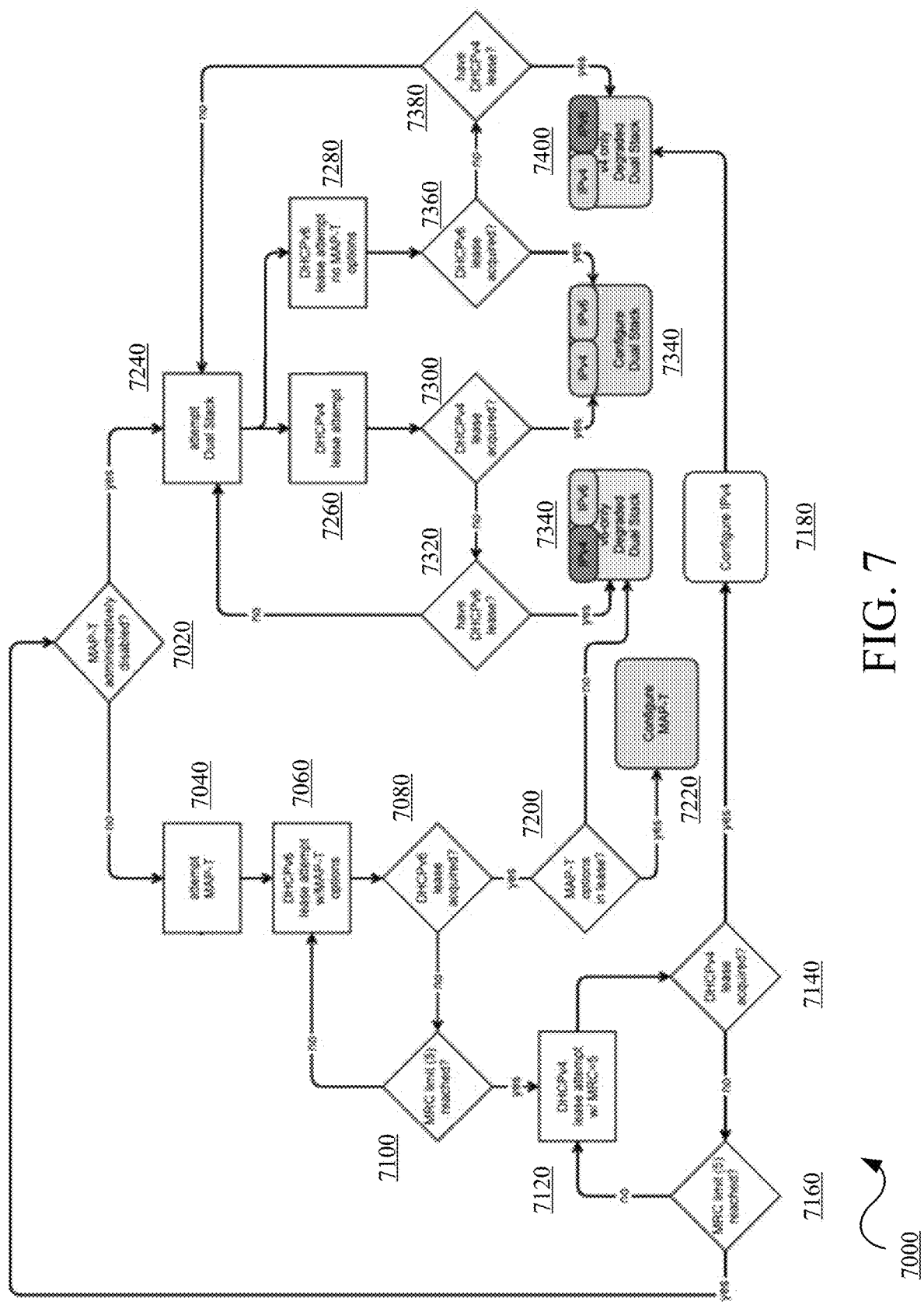
FIG. 7 is a diagram of an example flow for posture determination and network configuration acquisition in accordance with embodiments of this disclosure.

FIG. 7 is a diagram of an example flow 7000 for posture determination and network configuration acquisition in accordance with embodiments of this disclosure. Appropriate portions of the flow 7000 can occur at different points in a state machine for posture determination and network configuration acquisition, as shown for example in FIG. 2. The flow 7000 can be performed by a device such the CPE 1300, a network device, a router, a gateway, and like devices. The device can include a posture controller and multiple DHCP clients such as, for example, a DHCP IPv4 client and a DHCP IPv6 client. The posture controller can control or direct execution by the DHCP clients. In some implementations, the posture controller is in communication with a service provider posture controller, which controls the sequencing executed by the posture controller at the device. In some implementations, the posture controller may not be in communication with the service provider posture controller, and can direct sequencing based on stored a preferred acquisition posture or posture acquisition information.

At 7020, the posture controller (or as indicated by the service provider posture controller) can determine whether a MAP-T acquisition posture is available, e.g., that MAP-T is not administratively disabled. If a MAP-T acquisition posture is available, at 7040, a MAP-T posture acquisition is initiated. In some implementations, a timer or counter can be used to temporally constrain an acquisition period or limit a number of attempts at obtaining a respective lease. For example, a counter can be set to a threshold of five (5). At 7060, a DHCP IPv6 client provisioned with MAP-T options starts an IPv6 address acquisition process. At 7080, a determination is made as to whether a IPv6 lease has been obtained. If no IPv6 lease has been obtained, at 7100, a determination is made as to whether a counter threshold has been reached. The IPv6 address acquisition process (7060) is cycled if the counter threshold has not been reached. If the counter threshold has been reached, then a DHCP IPv4 client starts an IPv4 address acquisition process at 7120. In some implementations, a timer or counter can be set as described herein.

At 7140, a determination is made as to whether a IPv4 lease has been obtained. If no IPv4 lease has been obtained, at 7140, a determination is made as to whether a counter threshold has been reached. The IPv4 address acquisition process (7120) is cycled if the counter threshold has not been reached. If the counter threshold has been reached, then the process is cycled back to 7020. If a IPv4 lease has obtained, at 7180, the device can be configured for IPv4 operation and at 7400, the device can operate in a degraded IPv4 only dual stack network configuration.

If a IPv6 lease has been obtained at 7080, then at 7200, a determination is made as whether MAP-T options are available in the IPv6 lease. At 7220, the device can operate in a MAP-T network configuration if MAP-T options are available in the IPv6 lease. At 7340, the device can operate in a degraded IPv6 only dual stack network configuration if no MAP-T options are available in the IPv6 lease.

If a MAP-T posture is not available, at 7240, a dual stack posture acquisition is initiated. At 7260 and 7280, a DHCP IPv4 client and a DHCP IPv6 client with no MAP-T options, starts a IPv4 address acquisition process and a IPv6 address acquisition process. At 7300 and 7360, determinations are made as to whether a IPv4 lease and an IPv6 lease have been obtained, respectively. At 7340, the device can operate in a dual stack network configuration upon successful acquisition of both IPv4 and IPv6 leases.

At 7320, a determination is made whether an IPv6 lease has been obtained if no IPv4 lease has been obtained. If an IPv6 lease has not been obtained, the process cycles back to re-attempting the dual stack posture acquisition at 7240. If an IPv6 lease has been obtained, then the device can operate in a degraded IPv6 only dual stack network configuration at 7340.

At 7380 a determination is made whether an IPv4 lease has been obtained if no IPv6 lease has been obtained. If an IPv4 lease has not been obtained, the process cycles back to re-attempting the dual stack posture acquisition at 7240. If an IPv4 lease has been obtained, then the device can operate in a degraded IPv4 only dual stack network configuration at 7400.

Figure 8:
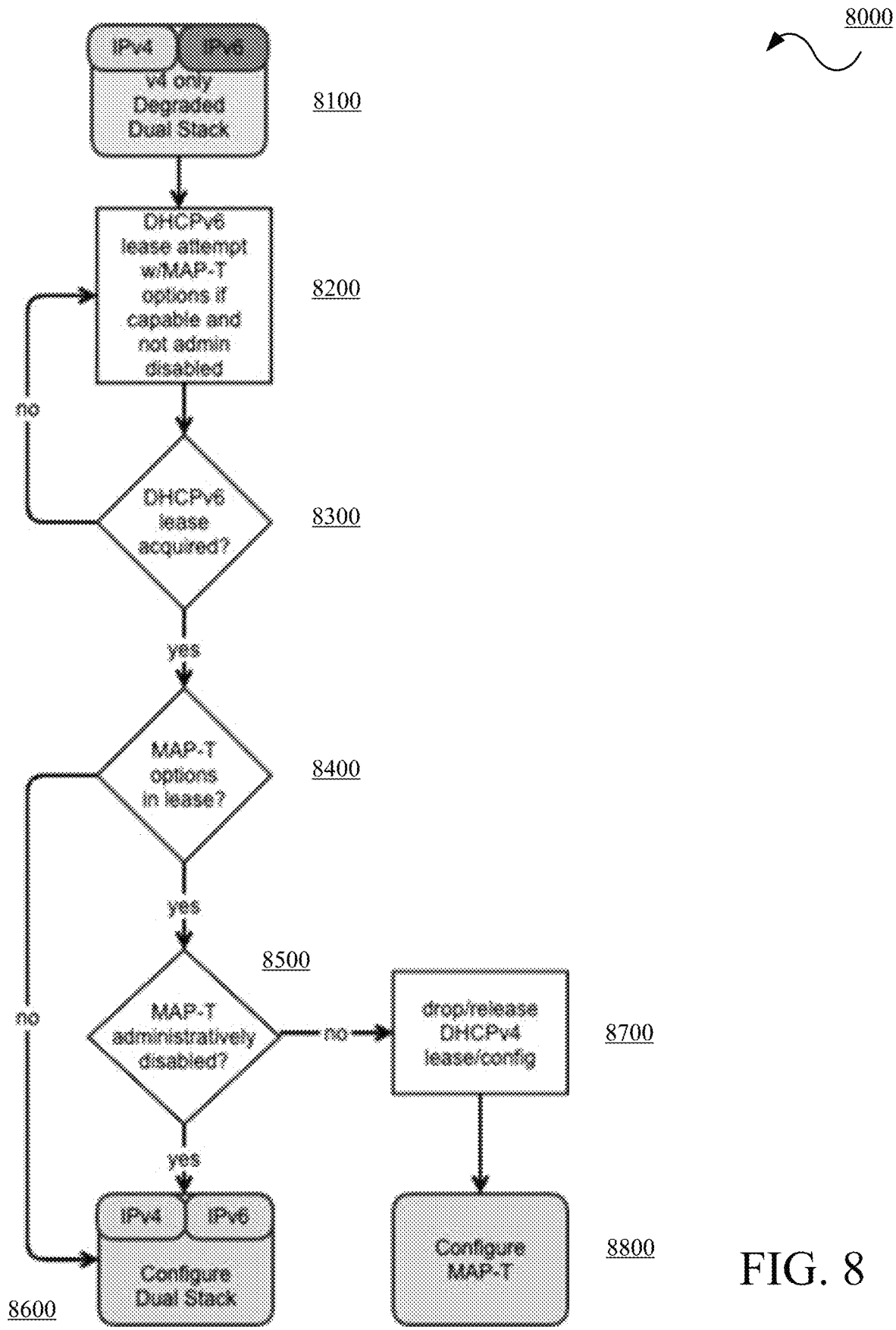
FIG. 8 is a diagram of an example flow for IPv4 degraded dual stack in accordance with embodiments of this disclosure.

FIG. 8 is a diagram of an example flow 8000 for a IPv4 degraded dual stack network configuration in accordance with embodiments of this disclosure. In some implementations, the flow 8000 can be executed in conjunction with FIGS. 2-7 and FIG. 9, as appropriate and applicable. The flow 8000 assumes a degraded IPv4 only dual stack network configuration at 8100. At 8200, a DHCP IPv6 client can attempt to acquire a IPv6 lease with MAP-T options if the device is capable and MAP-T is available, e.g., that MAP-T is not administratively disabled. At 8300, a determination is made whether an IPv6 lease has been obtained. If an IPv6 lease has not been obtained, the process cycles back to re-attempting the IPv6 lease acquisition at 8200. If a IPv6 lease has been obtained, then at 8400, a determination is made as whether MAP-T options are available in the IPv6 lease. If whether MAP-T options are available in the IPv6 lease, at 8500, a determination is made at whether MAP-T is available, e.g., that MAP-T is not administratively disabled. At 8600, the device can operate in a dual stack network configuration if MAP-T is not available. At 8700, if MAP-T is available, the IPv4 lease or address is released. At 8800, the device can operate in a MAP-T network configuration.

Figure 9:
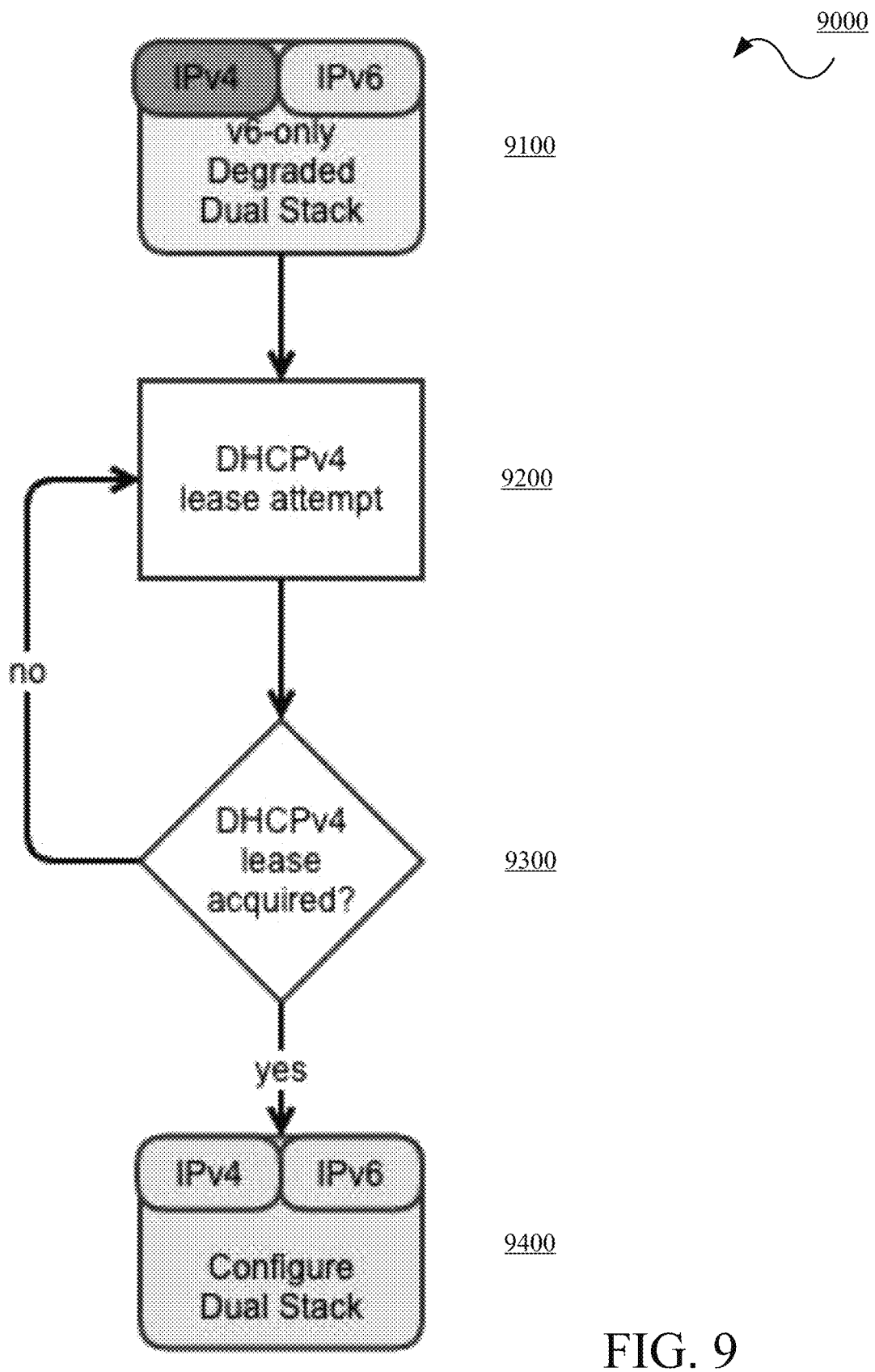
FIG. 9 is a diagram of an example flow for IPv6 degraded dual stack in accordance with embodiments of this disclosure.

FIG. 9 is a diagram of an example flow 9000 for IPv6 degraded dual stack network configuration in accordance with embodiments of this disclosure. In some implementations, the flow 9000 can be executed in conjunction with FIGS. 2-8, as appropriate and applicable. The flow 9000 assumes a degraded IPv6 only dual stack network configuration at 9100. At 9200, a DHCP IPv4 client can attempt to acquire a IPv4 lease. At 9300, a determination is made whether an IPv4 lease has been obtained. If an IPv4 lease has not been obtained, the process cycles back to re-attempting the IPv4 lease acquisition at 9200. At 9400, the device can operate in a dual stack network configuration if an IPv4 lease has been obtained. In some implementations, the flow 9000 can be used for a IPv4 degraded dual stack configuration by substitution of IPv4 with IPv6 as appropriate and applicable.

Figure 10:
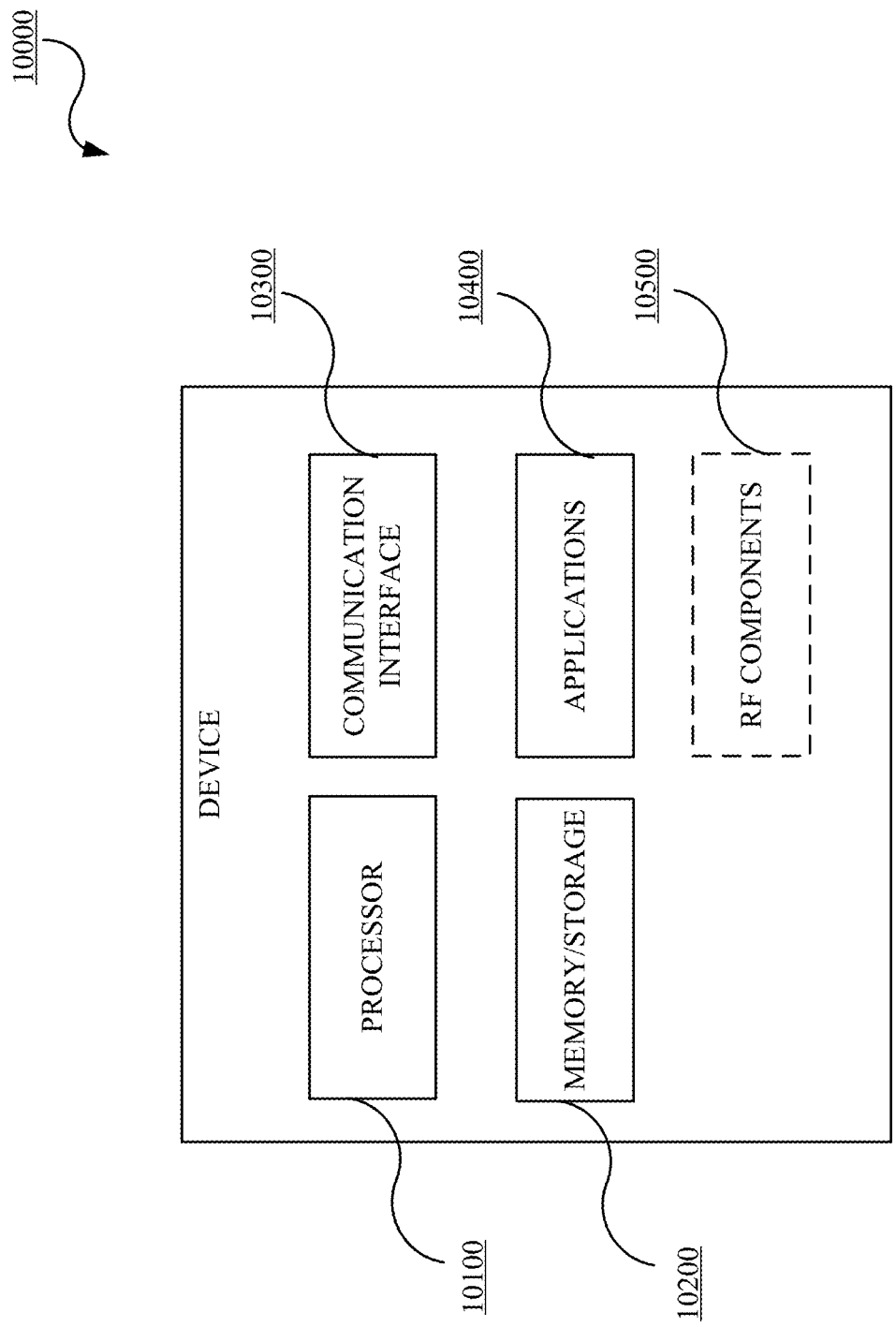
FIG. 10 is a block diagram of an example of a device in accordance with embodiments of this disclosure.

FIG. 10 is a block diagram of an example of a device 10000 in accordance with embodiments of this disclosure. The device 10000 can include, but is not limited to, a processor 10100, a memory/storage 10200, a communication interface 10300, and applications 10400. The device 10000 may include a RF component 10500 for wireless operation. The device 10000 may include or implement, for example, the CPE 1300, the mobile device 1400, the device 1500, DHCP servers, posture controller 1120, the DHCP client posture controller 1330, the DHCP IPv4 client 1310, and the DHCP IPv6 client 1320, as appropriate and applicable. In an implementation, appropriate memory/storage 10200 may store device information and the like. In an implementation, appropriate memory/storage 10200 is encoded with instructions for at least controlling and managing IPv4 and IPv6 address and/or lease acquisition methods as described herein. The techniques or methods described herein may be stored in appropriate memory/storage 10200 and executed by the appropriate processor 10100 in cooperation with the memory/storage 10200, the communications interface 10300, the applications 10400, and/or the RF component 10500, as appropriate and applicable. The device 10000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 11:
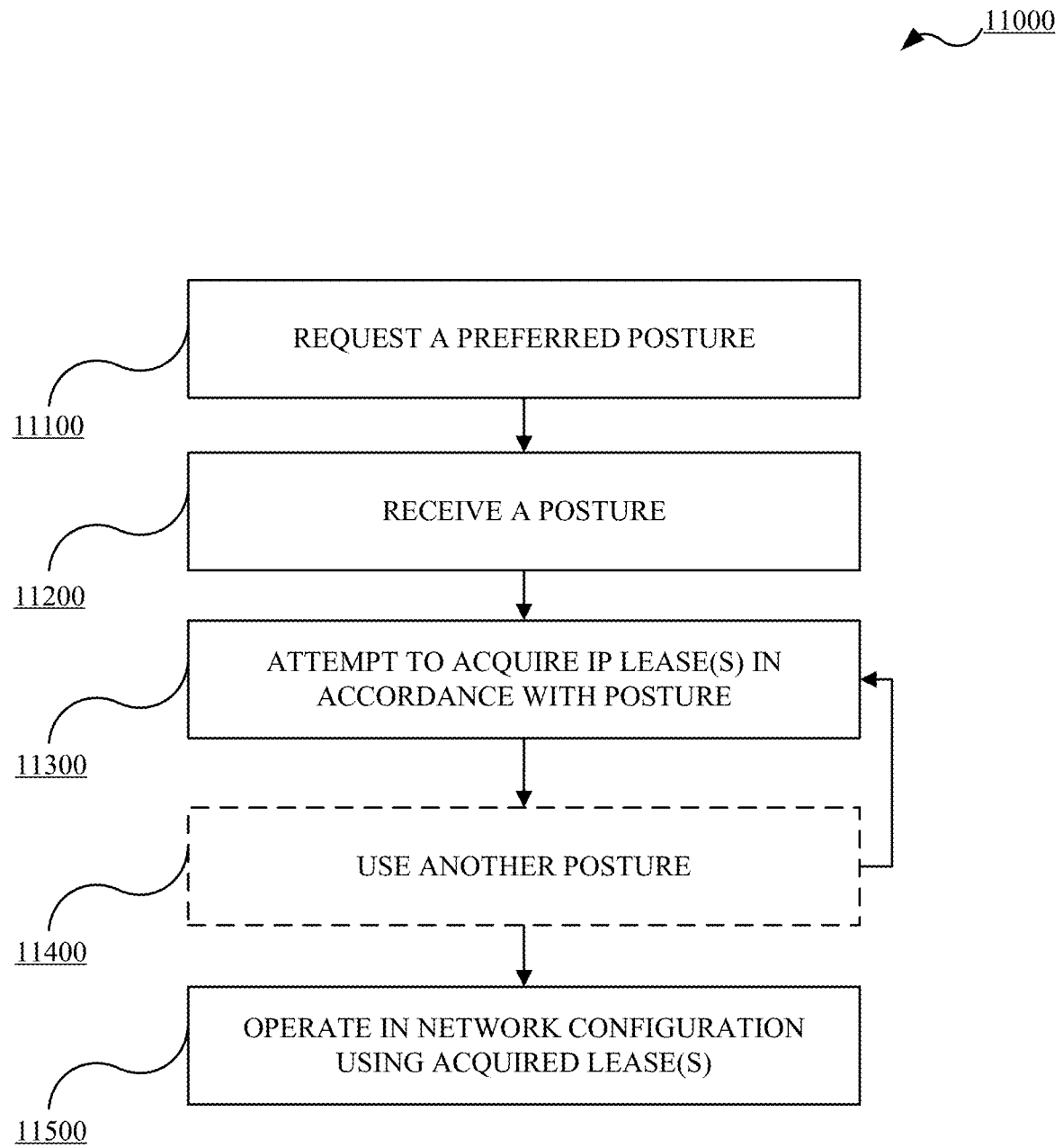
FIG. 11 is a flowchart of an example method for negotiated posture acquisition in accordance with embodiments of this disclosure.

FIG. 11 is a flowchart of an example method 11000 for providing multiple techniques to a customer premises equipment to acquire network connectivity in accordance with embodiments of this disclosure. The method 11000 includes: requesting 11100 a preferred acquisition posture; receiving 11200 an acquisition posture; attempting 11300 to acquire IP lease(s) in accordance with the received acquisition posture; if needed, using 11400 another acquisition posture; and operating 11500 in a network configuration using acquired IP lease(s). For example, the method 11000 may be implemented by the CPE 1300, the mobile device 1400, the device 1500, DHCP servers, posture controller 1120, the DHCP client posture controller 1330, the DHCP IPv4 client 1310, and the DHCP IPv6 client 1320, the processor 10100, the memory/storage 10200, the communication interface 10300, the applications 10400, and the RF component 10500, as appropriate and applicable.

The method 11000 includes requesting 11100 a preferred acquisition posture. One or more acquisition postures can be deployed on a device such as a CPE. One of the deployed acquisition postures can be identified or designated as a preferred acquisition posture, another deployed acquisition posture as a fallback acquisition posture, and so on. The preferred acquisition posture can be based on a variety of factors as described herein. In some embodiments, an order of preference can be designated for the deployed acquisition postures. The CPE can send a request to a service provider posture controller which includes device information including the preferred acquisition posture. In some implementations, the deployed acquisition postures can include a dual stack acquisition posture and a MAP-T acquisition posture.

The method 11000 includes receiving 11200 an acquisition posture. The service provider posture controller can select the preferred acquisition posture or one of the other deployed acquisition postures. The selection by the service provider posture controller is based on the device information and other factors including for example, network deployment, subscriber density, system provider or operator consideration, and other factors not available to the device.

The method 11000 includes attempting 11300 to acquire IP lease(s) in accordance with the received acquisition posture. The device can be provisioned with one or more DHCP IP clients including, for example, a DHCP IPv4 client and a DHCP IPv6 client. The posture controller on the device can initiate acquisition of an IP address and/or IP lease using the selected acquisition posture in accordance with the flows described for FIGS. 2-9 and 11-12.

The method 11000 includes, if needed, using 11400 another acquisition posture. In some implementations, in the event of an acquisition failure using the selected acquisition posture, the posture controller can request and receive another selected acquisition posture from the service provider controller. In some implementations, in the event of an acquisition failure using the selected acquisition posture, the posture controller can use another of the deployed acquisition postures. Acquisition attempts can be repeated as needed. In some implementations, a selected acquisition posture can be attempted multiple times.

The method 11000 includes operating 11500 in a network configuration using acquired IP lease(s). The device operates in accordance with the IP leases.

Figure 12:
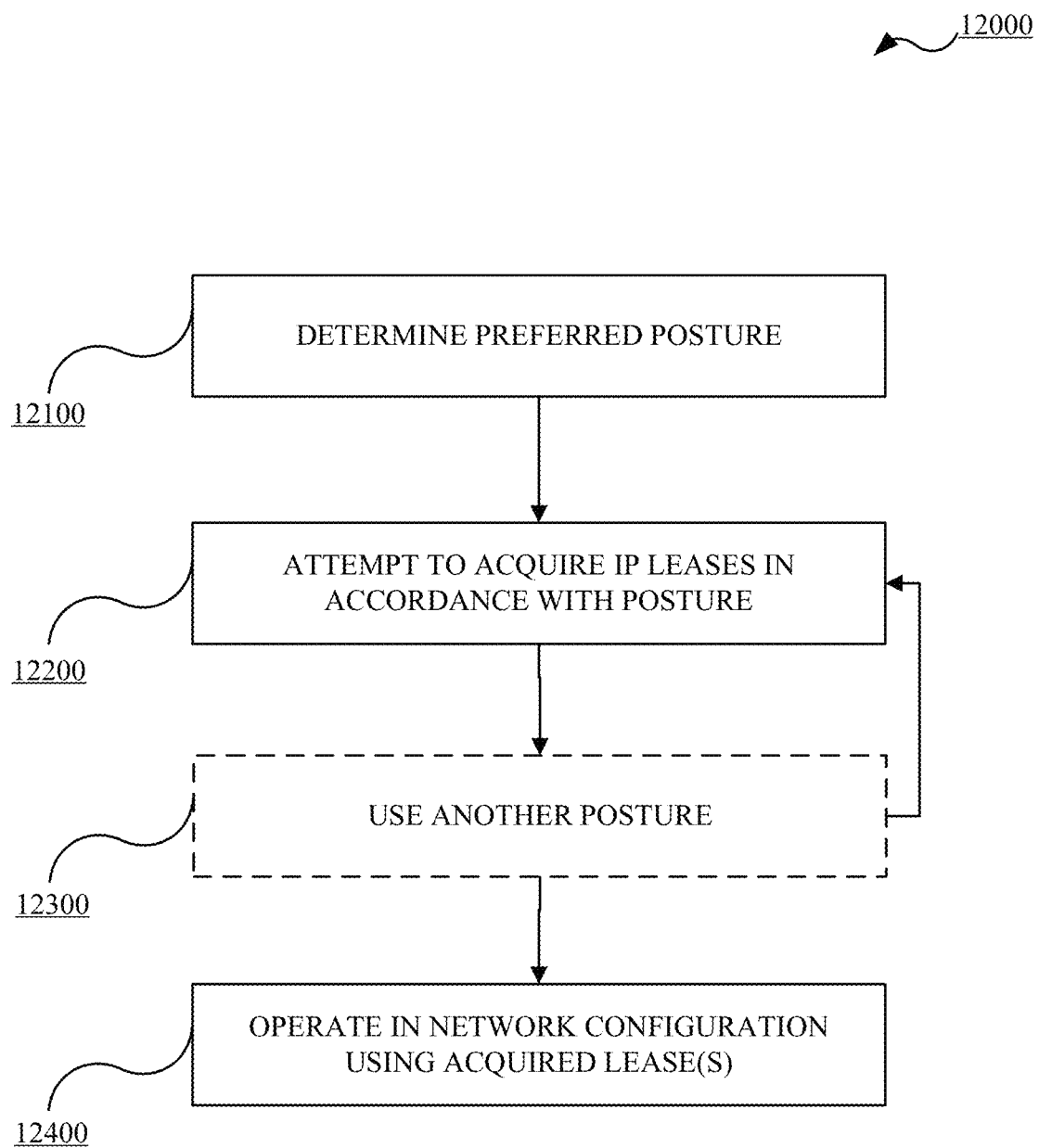
FIG. 12 is a flowchart of an example method for posture acquisition in accordance with embodiments of this disclosure.

FIG. 12 is a flowchart of an example method 12000 for providing multiple techniques to a customer premises equipment to acquire network connectivity in accordance with embodiments of this disclosure. The method 12000 includes: determining 12100 a preferred acquisition posture; attempting 12200 to acquire IP lease(s) in accordance with the preferred acquisition posture; if needed, using 12300 another acquisition posture; and operating 12300 in a network configuration using acquired IP lease(s). For example, the method 12000 may be implemented by the CPE 1300, the mobile device 1400, the device 1500, DHCP servers, posture controller 1120, the DHCP client posture controller 1330, the DHCP IPv4 client 1310, and the DHCP IPv6 client 1320, the processor 10100, the memory/storage 10200, the communication interface 10300, the applications 10400, and the RF component 10500, as appropriate and applicable.

The method 12000 includes determining 12100 a preferred acquisition posture. One or more acquisition postures can be deployed on a device such as a CPE. One of the deployed acquisition postures can be identified or designated as a preferred acquisition posture, another deployed acquisition posture as a fallback acquisition posture, and so on. The preferred acquisition posture can be based on a variety of factors as described herein. In some embodiments, an order of preference can be designated for the deployed acquisition postures. In some implementations, the deployed acquisition postures can include a dual stack acquisition posture and a MAP-T acquisition posture.

The method 12000 includes attempting 12200 to acquire IP lease(s) in accordance with the preferred acquisition posture. The device can be provisioned with one or more DHCP IP clients including, for example, a DHCP IPv4 client and a DHCP IPv6 client. The posture controller on the device can initiate acquisition of an IP address and/or IP lease using the selected posture in accordance with the flows described for FIGS. 2-9 and 11-12.

The method 12000 includes, if needed, using 12300 another acquisition posture. In some implementations, in the event of an acquisition failure using the preferred acquisition posture, the posture controller can use the fallback acquisition posture(s) from the deployed acquisition postures. Acquisition attempts can be repeated as needed. In some implementations, a selected posture can be attempted multiple times.

The method 12000 includes operating 12400 in a network configuration using acquired IP lease(s). The device operates in accordance with the IP leases.

In general, a method for acquiring an Internet Protocol (IP) lease includes sending, by a network device at a customer premises to a service provider system, a request for a preferred acquisition posture, where the network device is provisioned with multiple acquisition postures including the preferred acquisition posture, receiving, by the network device from the service provider system, a selected acquisition posture, attempting, by the network device, to acquire the IP lease using the selected acquisition posture, and operating, by the network device, using the acquired IP lease.

In some implementations, the method further includes determining, by the network device, the preferred acquisition posture by accessing memory on the network device. In some implementations, the method further includes receiving, by the network device from the service provider system, another selected acquisition posture when the selected acquisition posture fails to acquire the IP lease. In some implementations, the sending further includes sending, by the network device to the service provider system, device information including the preferred acquisition posture and at least one of device capabilities, posture considerations, deployed Dynamic Host Configuration Protocol (DHCP)

clients, environmental data, traffic data, premises information, network configuration, firmware default, or customer constraints. In some implementations, the service provider system determines the selected acquisition posture based on at least the device information and system provider constraints. In some implementations, the attempting further includes initiating, by the network device, at least one of a Dynamic Host Configuration Protocol (DHCP) IP version 4 (IPv4) client to acquire a IPv4 lease or a DHCP IP version 6 (IPv6) client to acquire a IPv6 lease, based on the selected acquisition posture. In some implementations, both the DHCP IPv4 client and the DHCP IPv6 client are initiated when the selected acquisition posture is a dual stack acquisition posture. In some implementations, the method further includes re-attempting, using the DHCP IPv4 client, to acquire the IPv4 lease when a IPv6 lease has been successfully acquired. In some implementations, the method further includes re-attempting, using the DHCP IPv6 client, to acquire the IPv6 lease when a IPv4 lease has been successfully acquired. In some implementations, the DHCP IPv6 client is initiated when the selected acquisition posture is a Mapping of Address and Port using translation (MAP-T) acquisition posture. In some implementations, the method further includes initiating, by the network device, a Dynamic Host Configuration Protocol (DHCP) IP version 4 (IPv4) client to acquire a IPv4 lease, initializing, by the network device, one of a DHCP IPv4 client timer or DHCP IPv4 client counter, initiating, by the network device, a Dynamic Host Configuration Protocol (DHCP) IP version 6 (IPv6) client to acquire a IPv6 lease when the DHCP IPv4 client timer expires or the DHCP IPv4 client counter reaches or exceeds a threshold, initializing, by the network device, one of a DHCP IPv6 client timer or DHCP IPv6 client counter, and restarting with the sending when the DHCP IPv6 client timer expires or the DHCP IPv6 client counter reaches or exceeds a threshold.

In general, a method for acquiring an Internet Protocol (IP) lease includes determining, by a network device, a preferred acquisition posture by accessing memory on the network device, wherein the network device is provisioned with multiple acquisition postures including the preferred acquisition posture, attempting, by the network device, to acquire the IP lease using the preferred acquisition posture, and operating, by the network device, using the acquired IP lease.

In some implementations, the method further includes initiating, by the network device, at least one of a Dynamic Host Configuration Protocol (DHCP) IP version 4 (IPv4) client to acquire a IPv4 lease or a DHCP IP version 6 (IPv6) client to acquire a IPv6 lease, based on the preferred acquisition posture. In some implementations, both the DHCP IPv4 client and the DHCP IPv6 client are initiated when the preferred acquisition posture is a dual stack acquisition posture. In some implementations, the method further includes re-attempting, using the DHCP IPv4 client, to acquire the IPv4 lease when a IPv6 lease has been successfully acquired and re-attempting, using the DHCP IPv6 client, to acquire the IPv6 lease when a IPv4 lease has been successfully acquired. In some implementations, the DHCP IPv6 client is initiated when the preferred acquisition posture is a Mapping of Address and Port using translation (MAP-T) acquisition posture. In some implementations, the method further includes initiating, by the network device, a Dynamic Host Configuration Protocol (DHCP) IP version 4 (IPv4) client to acquire a IPv4 lease, initializing, by the network device, one of a DHCP IPv4 client timer or DHCP IPv4 client counter, initiating, by the network device, a Dynamic Host Configuration Protocol (DHCP) IP version 6 (IPv6) client to acquire a IPv6 lease when the DHCP IPv4 client timer expires or the DHCP IPv4 client counter reaches or exceeds a threshold, initializing, by the network device, one of a DHCP IPv6 client timer or DHCP IPv6 client counter, and restarting with the determining when the DHCP IPv6 client timer expires or the DHCP IPv6 client counter reaches or exceeds a threshold.

In general, a customer premises equipment includes a memory configured to store at least a preferred acquisition posture, a fallback acquisition posture, and device information, a Dynamic Host Configuration Protocol (DHCP) IP version 4 (IPv4) client configured to acquire a IPv4 lease, a DHCP IP version 6 (IPv6) client configured to acquire a IPv6 lease, and a posture controller configured to control the DHCP IPv4 client and the DHCP IPv4 client. The posture controller configured to transmit the preferred acquisition posture and the device information to a service provider posture controller, receive a selected acquisition posture from the service provider posture controller, where the selected acquisition posture is based on at least the preferred acquisition posture, the device information, and service provider constraints, attempt to acquire the IP lease using the selected acquisition posture and at least one of the DHCP IPv4 client or the DHCP IPv6 client, and operate using the acquired IP lease.

In some implementations, both the DHCP IPv4 client and the DHCP IPv6 client are initiated when the selected acquisition posture is a dual stack acquisition posture. In some implementations, the DHCP IPv6 client is initiated when the selected acquisition posture is a Mapping of Address and Port using translation (MAP-T) acquisition posture.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software packet, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for acquiring an Internet Protocol (IP) lease, the method comprising:
    sending, by a network device at a customer premises to a posture controller at a service provider system, a request to use by the network device a preferred acquisition posture to acquire an IP lease, wherein the network device is provisioned with multiple acquisition postures including the preferred acquisition posture;
    receiving, by the network device from the posture controller at the service provider system, a selected acquisition posture based on network device information for use by the network device to acquire the IP lease in response to the request;
    attempting, by the network device, to acquire the IP lease using the selected acquisition posture; and
    operating, by the network device, using the acquired IP lease.

2. The method of claim 1, wherein the sending further comprises:
    sending, by the network device to the service provider system, device information including the preferred acquisition posture and at least one of device capabilities, posture considerations, deployed Dynamic Host Configuration Protocol (DHCP) clients, environmental data, traffic data, premises information, network configuration, firmware default, or customer constraints.

3. The method of claim 2, wherein the service provider system determines the selected acquisition posture based on at least the device information and system provider constraints.

4. The method of claim 1, wherein the attempting further comprises:
    initiating, by the network device, at least one of a Dynamic Host Configuration Protocol (DHCP) IP version 4 (IPv4) client to acquire a IPv4 lease or a DHCP IP version 6 (IPv6) client to acquire a IPv6 lease, based on the selected acquisition posture.

5. The method of claim 4, wherein both the DHCP IPv4 client and the DHCP IPv6 client are initiated when the selected acquisition posture is a dual stack acquisition posture.

6. The method of claim 5, further comprising:
    re-attempting, using the DHCP IPv4 client, to acquire the IPv4 lease when a IPv6 lease has been successfully acquired.

7. The method of claim 5, further comprising:
    re-attempting, using the DHCP IPv6 client, to acquire the IPv6 lease when a IPv4 lease has been successfully acquired.

8. The method of claim 4, wherein the DHCP IPv6 client is initiated when the selected acquisition posture is a Mapping of Address and Port using translation (MAP-T) acquisition posture.

9. The method of claim 1, further comprising:
determining, by the network device, the preferred acquisition posture by accessing memory on the network device.

10. The method of claim 1, further comprising:
receiving, by the network device from the service provider system, another selected acquisition posture when the selected acquisition posture fails to acquire the IP lease.

11. The method of claim 1, further comprising:
initiating, by the network device, a Dynamic Host Configuration Protocol (DHCP) IP version 4 (IPv4) client to acquire a IPv4 lease;
initializing, by the network device, one of a DHCP IPv4 client timer or DHCP IPv4 client counter;
initiating, by the network device, a Dynamic Host Configuration Protocol (DHCP) IP version 6 (IPv6) client to acquire a IPv6 lease when the DHCP IPv4 client timer expires or the DHCP IPv4 client counter reaches or exceeds a threshold;
initializing, by the network device, one of a DHCP IPv6 client timer or DHCP IPv6 client counter; and
restarting with the sending when the DHCP IPv6 client timer expires or the DHCP IPv6 client counter reaches or exceeds a threshold.

12. A method for acquiring an Internet Protocol (IP) lease, the method comprising:
determining, by a network device, a preferred acquisition posture by accessing memory on the network device, wherein the network device is provisioned with multiple acquisition postures, one of the multiple acquisition postures is the preferred acquisition posture, and each of the multiple acquisition postures is a method for acquiring an IP lease;
attempting, by the network device, to acquire the IP lease using the preferred acquisition posture; and
operating, by the network device, using the acquired IP lease.

13. The method of claim 12, wherein the attempting further comprises:
initiating, by the network device, at least one of a Dynamic Host Configuration Protocol (DHCP) IP version 4 (IPv4) client to acquire a IPv4 lease or a DHCP IP version 6 (IPv6) client to acquire a IPv6 lease, based on the preferred acquisition posture.

14. The method of claim 13, wherein both the DHCP IPv4 client and the DHCP IPv6 client are initiated when the preferred acquisition posture is a dual stack acquisition posture.

15. The method of claim 14, further comprising:
re-attempting, using the DHCP IPv4 client, to acquire the IPv4 lease when a IPv6 lease has been successfully acquired; and
re-attempting, using the DHCP IPv6 client, to acquire the IPv6 lease when a IPv4 lease has been successfully acquired.

16. The method of claim 13, wherein the DHCP IPv6 client is initiated when the preferred acquisition posture is a Mapping of Address and Port using translation (MAP-T) acquisition posture.

17. The method of claim 12, further comprising:
initiating, by the network device, a Dynamic Host Configuration Protocol (DHCP) IP version 4 (IPv4) client to acquire a IPv4 lease;
initializing, by the network device, one of a DHCP IPv4 client timer or DHCP IPv4 client counter;
initiating, by the network device, a Dynamic Host Configuration Protocol (DHCP) IP version 6 (IPv6) client to acquire a IPv6 lease when the DHCP IPv4 client timer expires or the DHCP IPv4 client counter reaches or exceeds a threshold;
initializing, by the network device, one of a DHCP IPv6 client timer or DHCP IPv6 client counter; and
restarting with the determining when the DHCP IPv6 client timer expires or the DHCP IPv6 client counter reaches or exceeds a threshold.

18. A customer premises equipment comprising:
a memory configured to store at least a preferred acquisition posture, a fallback acquisition posture, and device information;
a Dynamic Host Configuration Protocol (DHCP) IP version 4 (IPv4) client configured to acquire a IPv4 lease;
a DHCP IP version 6 (IPv6) client configured to acquire a IPv6 lease; and
a posture controller configured to control the DHCP IPv4 client and the DHCP IPv4 client, the posture controller configured to:
transmit the preferred acquisition posture and the device information to a service provider posture controller;
receive a selected acquisition posture from the service provider posture controller, wherein the selected acquisition posture is based on at least the preferred acquisition posture, the device information, and service provider constraints;
attempt to acquire the IP lease using the selected acquisition posture and at least one of the DHCP IPv4 client or the DHCP IPv6 client; and
operate using the acquired IP lease.

19. The customer premises equipment of claim 18, wherein both the DHCP IPv4 client and the DHCP IPv6 client are initiated when the selected acquisition posture is a dual stack acquisition posture.

20. The customer premises equipment of claim 18, wherein the DHCP IPv6 client is initiated when the selected acquisition posture is a Mapping of Address and Port using translation (MAP-T) acquisition posture.

* * * * *